(12) United States Patent
Regev et al.

(10) Patent No.: US 6,959,358 B2
(45) Date of Patent: Oct. 25, 2005

(54) DISTRIBUTED CONTENT ADDRESSABLE MEMORY

(75) Inventors: Alon Regev, Woodland Hills, CA (US); Zvi Regev, West Hills, CA (US)

(73) Assignee: Micron Technology, Inc., Boise, ID (US)

( * ) Notice: Subject to any disclaimer, the term of this patent is extended or adjusted under 35 U.S.C. 154(b) by 401 days.

(21) Appl. No.: 10/179,383

(22) Filed: Jun. 26, 2002

(65) Prior Publication Data

US 2003/0009618 A1 Jan. 9, 2003

Related U.S. Application Data

(60) Provisional application No. 60/303,226, filed on Jul. 6, 2001.

(51) Int. Cl.[7] .............................................. G06F 12/00
(52) U.S. Cl. ....................................... 711/108; 365/108
(58) Field of Search ............................ 711/108; 370/13, 370/85.1, 85.5, 85.12, 85.13, 85.14, 85.15, 94.1, 92; 340/825.05; 365/49

(56) References Cited

U.S. PATENT DOCUMENTS

| | | | |
|---|---|---|---|
| 4,791,606 A | 12/1988 | Threewitt et al. | |
| 5,055,999 A | * 10/1991 | Frank et al. | ................. 711/163 |
| 5,099,476 A | 3/1992 | Berkovich | |
| 5,200,953 A | * 4/1993 | Spatafore et al. | ........... 370/429 |
| 5,249,201 A | 9/1993 | Posner et al. | |
| 5,469,166 A | 11/1995 | Regev | |
| 5,920,886 A | 7/1999 | Feldmeier | |
| 6,370,613 B1 | 4/2002 | Diede et al. | |
| 2001/0048687 A1 | * 12/2001 | Coden | ........................ 370/403 |
| 2002/0078310 A1 | * 6/2002 | Frank et al. | ................ 711/148 |

OTHER PUBLICATIONS

"What is a CAM (Content–Addressable Memory)?" Music Semiconductors Application Brief AB–N6, Rev. 2a, Sep. 30, 1998, 4pp.
"Advantages of CAM in ASIC–Based Network Address Processing," Music Semiconductors Application Brief AB–N11, Rev. 1.2a Draft, Sep. 30, 1998, 4pp.

* cited by examiner

Primary Examiner—Jack A. Lane
(74) Attorney, Agent, or Firm—Dickstein Shapiro Norin & Oshinsky LLP (57) ABSTRACT

The present invention provides a large capacity distributed content addressable memory (CAM) made up of a plurality of smaller CAMs interconnected on a high speed data bus. Each of the smaller CAMs is located at a local node on the data bus and configured to receive commands originating from both the local node in which the CAM is located and a local node in which another CAM on the data bus is located. As the resources and the data being stored by all the CAMs are shared through the high speed data bus, the aggregate contents of all the CAMs can be viewed as being stored in a single virtual CAM.

41 Claims, 8 Drawing Sheets

DISTRIBUTED CAM RING

FIG. 1

PACKET STRUCTURE

DISTRIBUTED CONTENT ADDRESSABLE MEMORY

This application claims the benefit of U.S. Provisional Application No. 60/303,226 filed Jul. 6, 2001, the content of which is incorporated herein in its entirety.

FIELD OF THE INVENTION

The present invention relates generally to semiconductor memory, and more particularly to a distributed content addressable memory.

BACKGROUND OF THE INVENTION

A content addressable memory (CAM) is a memory device that accelerates any application requiring fast searches of a database, list, or pattern, such as in database machines, image or voice recognition, or computer and communication networks. CAMs provide benefits over other memory search algorithms by simultaneously comparing the desired information (i.e., data being stored within a given memory location) against the entire list of pre-stored entries. As a result of their unique searching algorithm, CAM devices are frequently employed in network equipment, particularly routers and switches, computer systems and other devices that require rapid content searching.

In order to perform a memory search in the above-identified manner, CAMs are organized differently than other memory devices (e.g., random access memory (RAM), dynamic RAM (DRAM), etc.). For example, data is stored in a RAM in a particular location, called an address. During a memory access, the user supplies an address and reads into or gets back the data at the specified address.

In a CAM, however, data is stored in locations in a somewhat random fashion. The locations can be selected by an address bus, or the data can be written into the first empty memory location. Every location has a pair of status bits that keep track of whether the location is storing valid information in it or is empty and available or writing.

Once information is stored in a memory location, it is found doing a memory search by comparing every bit in any memory location with every bit of data in a comparand register circuit. When the content stored in the CAM memory location does not match the data placed in the comparand register, the CAM device returns a no match indication. When the content stored in the CAM memory location matches the data placed in the comparand register, the CAM device returns a match indication. In addition, the CAM returns the identification of the address location in which the matching data is stored. Thus, with a CAM, the user supplies the data and gets back an indication of an address where a matching data is stored in the memory.

While CAMs offer numerous advantages over other forms of memory, there are some drawbacks. For example, its size may be limited by a number of factors, including the practical number of bits in a word, the total number of words in the memory, and the amount of power required to operate a CAM. For data network routing, it is desirable to have a very large capacity CAM that operates faster than known CAMs.

BRIEF SUMMARY OF THE INVENTION

The present invention provides a large capacity distributed CAM made up of a plurality of smaller CAMs interconnected on a high speed data bus. Each of the smaller CAMs is located at a local node on the high speed bus and configured to receive commands originating from both the local node in which the CAM is located and a local node in which another CAM on the data bus is located. As the resources and the data being stored by all the CAMs are shared through the high speed data bus, the aggregate contents of all the CAMs can be viewed as being stored in a single virtual CAM.

BRIEF DESCRIPTION OF THE DRAWINGS

The above and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use the invention, and it is to be understood that structural, logical or procedural changes may be made to the specific embodiments disclosed without departing from the spirit and scope of the present invention.

Figure 1:
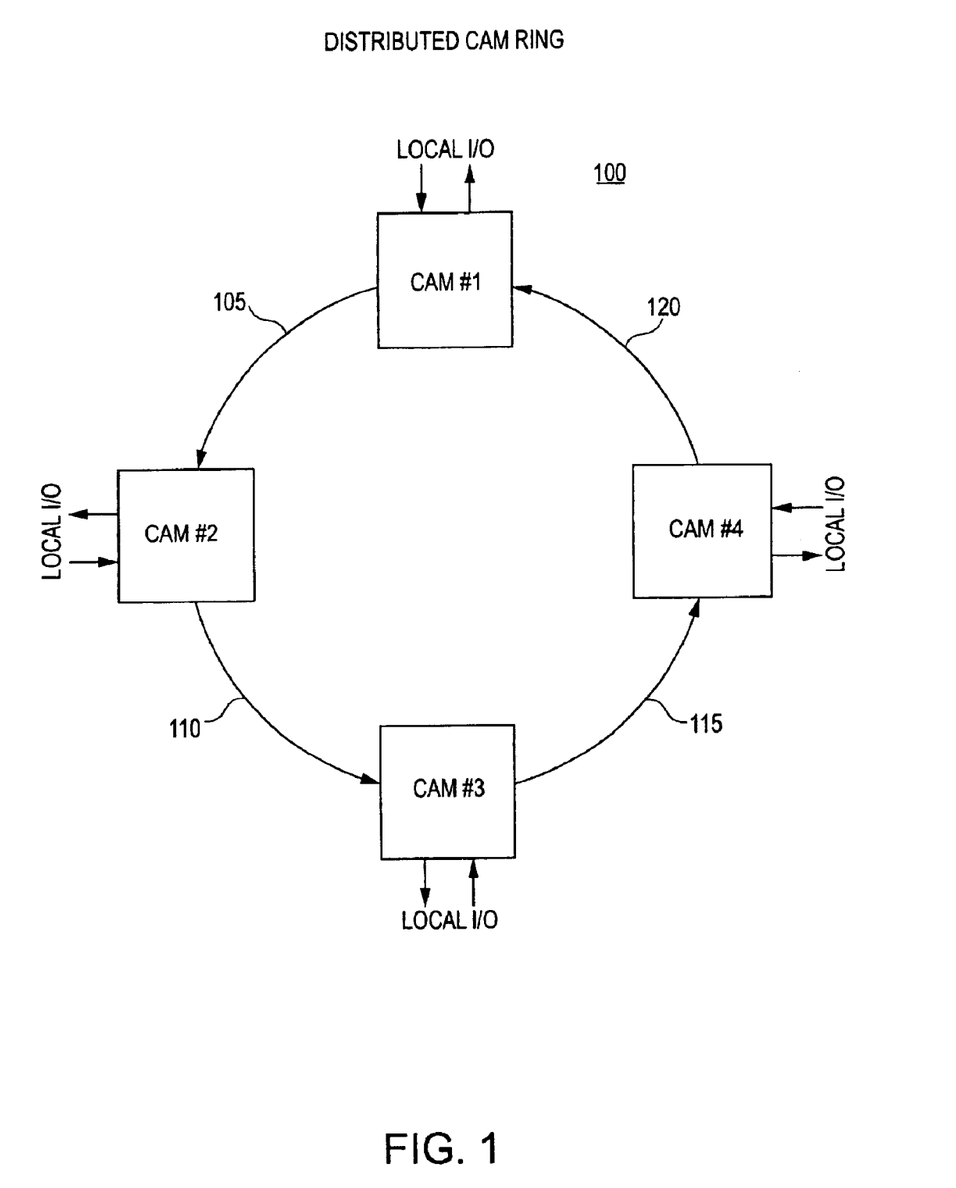
FIG. 1 depicts a simplified schematic diagram of a distributed CAM ring system, in accordance with an exemplary embodiment of the invention.

FIG. 1 depicts a simplified schematic diagram of a distributed CAM ring system, in accordance with an exemplary embodiment of the invention. CAM #1 is coupled to CAM #2 via high-speed multiple-bit (e.g., 16-bit) data bus 105. CAM #2 is coupled to CAM #3 via high-speed multiple-bit data bus 110. CAM #3 is coupled to CAM #4 via high-speed multiple-bit data bus 115. CAM #4 is coupled to CAM #1 via high-speed multiple-bit data bus 120. Further, as will be described more fully below, each CAM has a local input/output (I/O) interface through which commands and data are received and results are returned.

Figure 2:
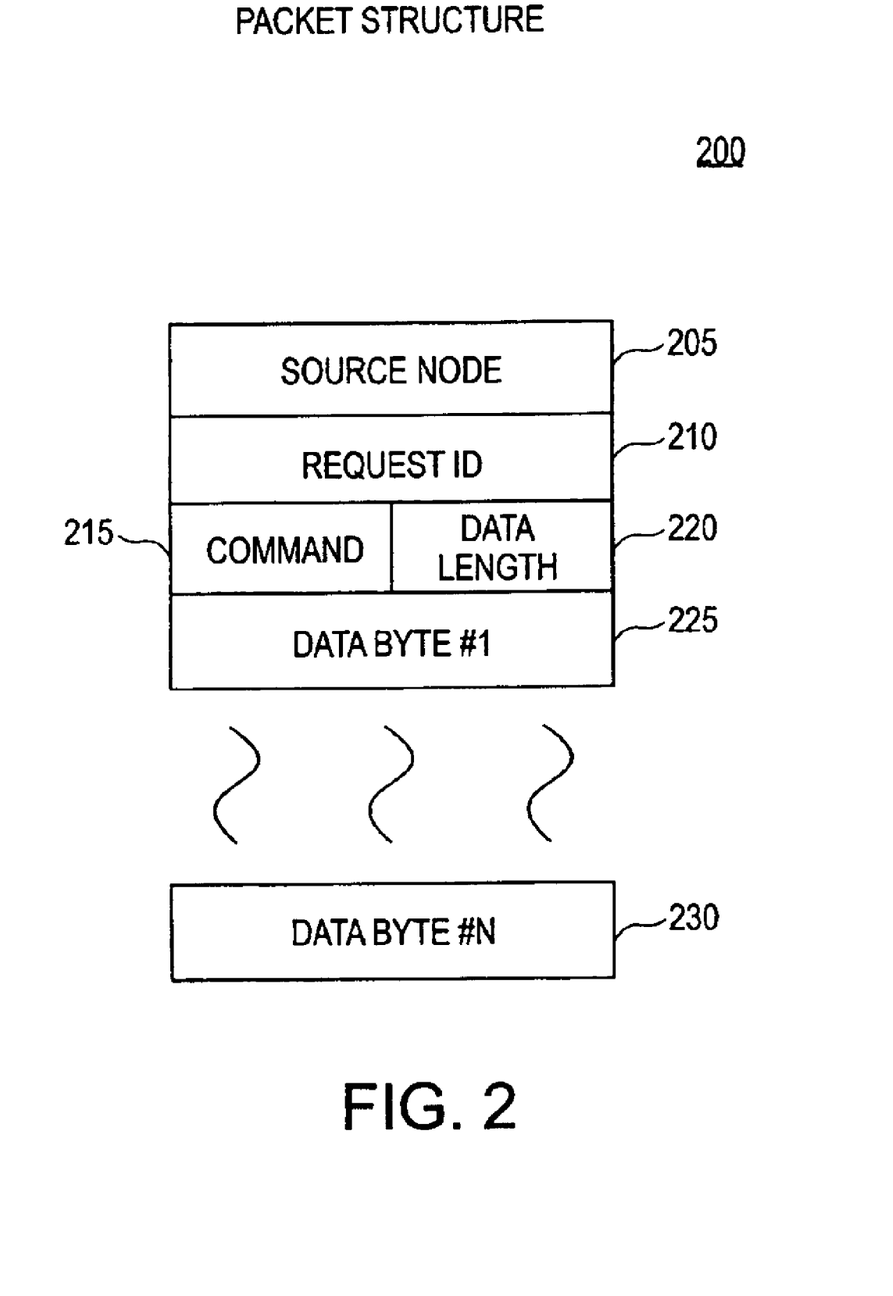
FIG. 2 depicts a simplified diagram of a packet structure used in the distributed CAM system of FIG. 1, in accordance with an exemplary embodiment of the invention.

FIG. 2 depicts a simplified diagram of a packet structure 200 used in the distributed CAM ring system 100 of FIG. 1, in accordance with an exemplary embodiment of the invention. For purposes of simplicity, the packet structure 200 is depicted as containing five fields. The first field is the source node field 205. The source node field 205 identifies the CAM from which the command was originally issued and to which CAM the result must be returned.

The second field of the packet structure 200 is the request identification field 210. The request identification field 210 contains the identification for a particular command originated at a local node. The request identification field 210 is used to associate a command with a response received from one of the CAMs. The response contains the same request identification as the original command.

The third field of the packet structure 200 is the command field 215. The command field 215 is one of "Search", "Search Result", "Learn", or "Delete". Only "Search", "Learn" and "Delete" originate from a local input (e.g., a line card (not shown) in connection with a high-end network router implementation, etc.). Search Result generally originates with a CAM and replaces the original Search command.

The fourth field of the packet structure 200 is the data length field 220. The data length field 220 indicates the number of data bytes in the packet. The data 225 itself is also included in the packet structure 200 as the fifth field. Generally, the amount of data contained in the packet structure 200 is command and implementation dependent.

The distributed CAM 100 can operate in one of three different modes: "Distributed Data", "Replicated Data", or "Cache" modes. In Distributed Data mode, data is stored only in the CAM in which it is learned. In this mode, since the data can be found in only one CAM on the ring, searches have to be conducted in each CAM until the desired data is located in the CAM in which is was learned.

In Replicated Data mode, all learned data is copied to all CAMs on the ring. In this mode, as with the Distributed Data mode, searches occur locally within each node, however, Learns are propagated to every CAM on the ring. For example, when a command is received in a given local node to Learn a data segment, that data segment is stored not only in the local node in which the command is received, but also in every CAM on the ring.

In Cache mode, data is initially stored only in the CAM where it is Learned; however, when another CAM on the ring searches for that data and it is not found locally, a "cache" copy is created in that node. This allows faster searches of the most recently used data but does not require replication of all the data, as does the Replicated Data mode.

Figure 3:
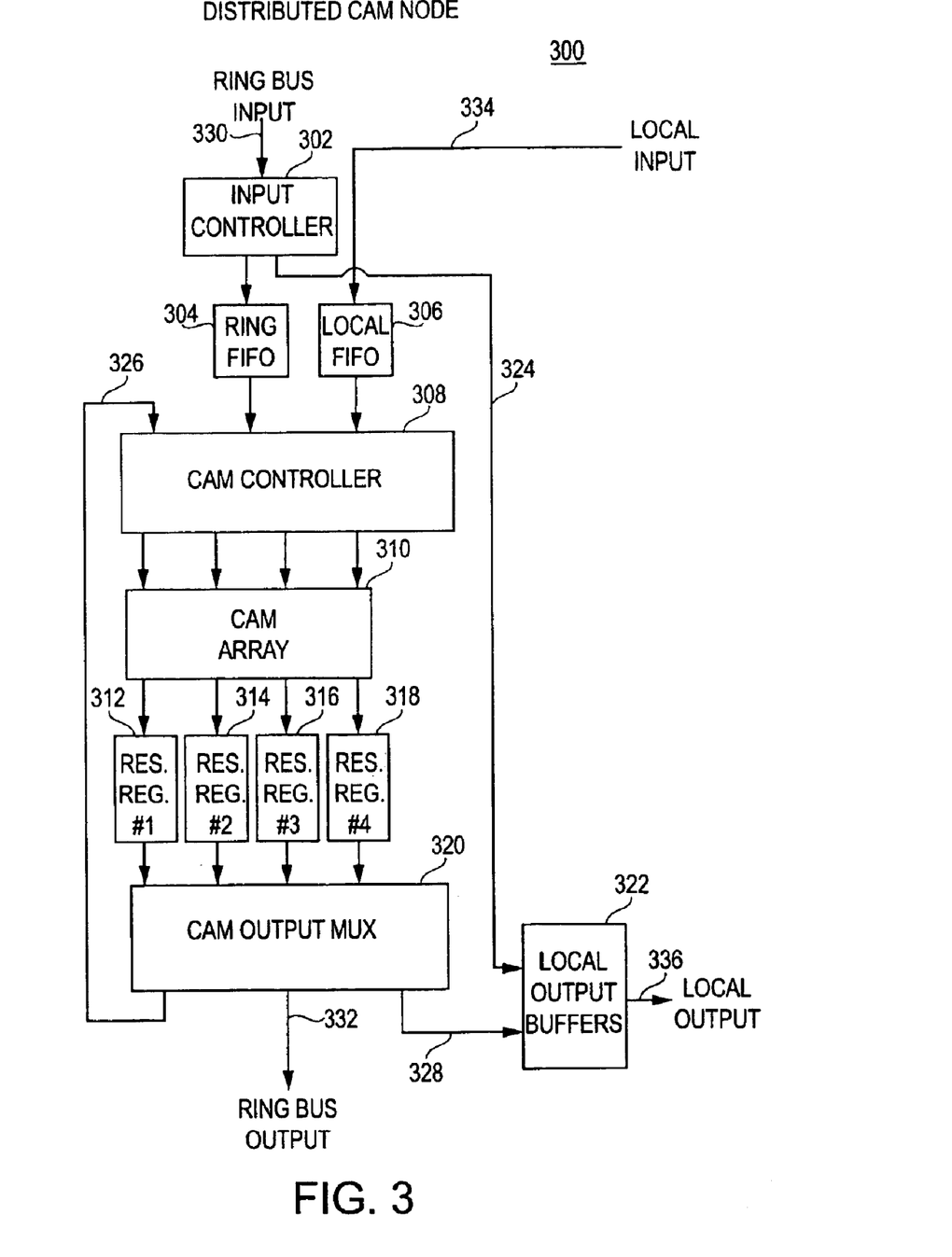
FIG. 3 depicts a simplified schematic diagram of a node on the distributed CAM system of FIG. 1, in accordance with an exemplary embodiment of the invention.

FIG. 3 depicts a simplified schematic diagram of a node 300 on the distributed CAM ring system 100 of FIG. 1, in accordance with an exemplary embodiment of the invention. The node 300, as does every node on the distributed CAM ring system 100, contains a ring bus input 330, a ring bus output 332, a local input 334 and a local output 336.

As depicted in FIG. 3, the ring bus input 330 is coupled to input controller 302. Input controller 302 is, in turn, coupled to inputs of both ring first-in-first-out (FIFO) buffer 304 and local output buffer 322. Local input 334 is coupled to local FIFO buffer 306. Both ring FIFO 304 and local FIFO 306 are coupled to an input of CAM controller 308. Four outputs of CAM controller 308 are depicted as being respectively coupled to four inputs of CAM array 310. CAM array 310 contains the memory cells and match detection circuits described above. Four outputs of CAM array 310 are respectively coupled to inputs of four result registers 312–318. The outputs of result registers 312–318 are respectively coupled to inputs of CAM output multiplexer 320.

A first output of CAM output multiplexer 320 is coupled to the ring bus output 332. A second output of CAM output multiplexer 320 is fed back into an input of CAM controller 308, via feedback path 326. A third output of CAM output multiplexer 320 is coupled to the local output buffer 322.

Figure 4:
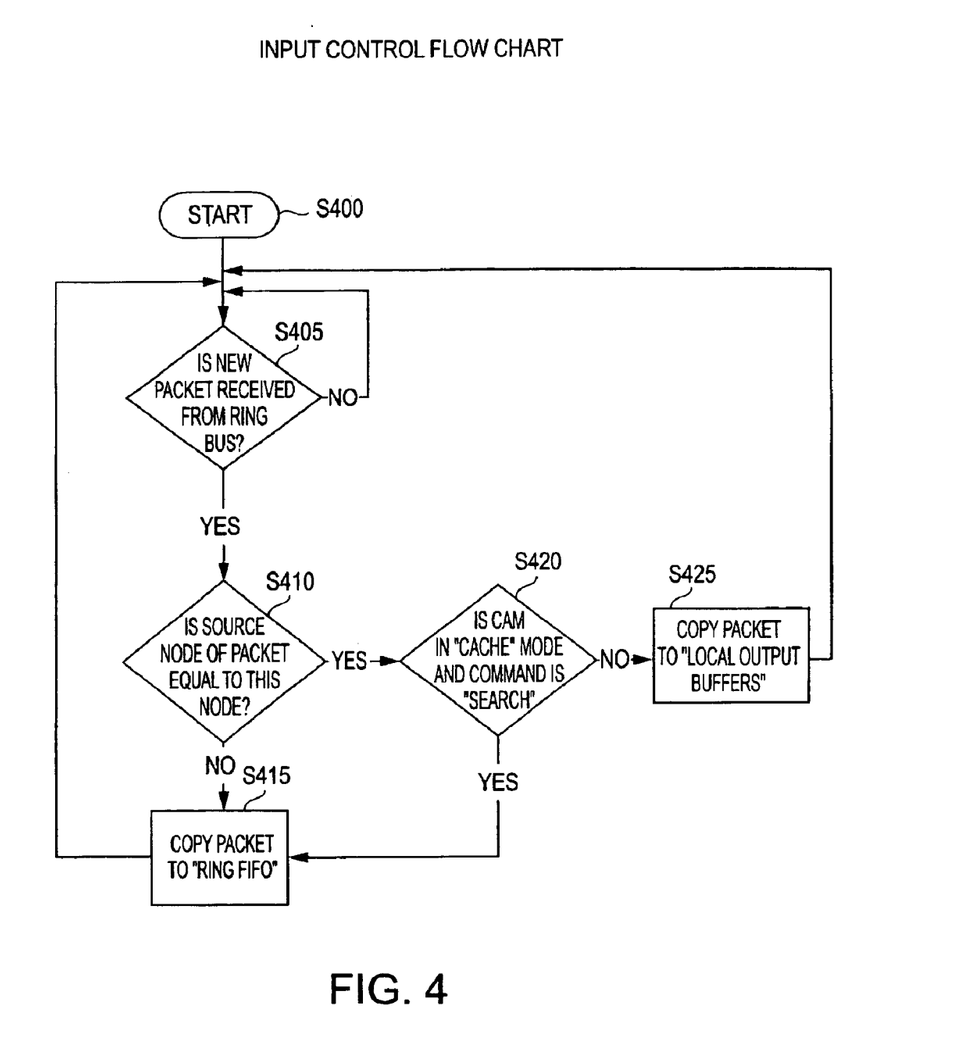
FIG. 4 depicts a flowchart illustrating an operational flow of the input controller of FIG. 3, in accordance with an exemplary embodiment of the invention.

Turning to FIG. 4, a flowchart illustrates an operational flow of the input controller 302 (of FIG. 3), in accordance with an exemplary embodiment of the invention. The input controller 302 essentially checks to see whether the packet has gone around the ring once. As described above, the packet contains a source node field 205 that identifies the source node of the packet (i.e., the node in which the command originated). If the source node identification matches that of the current local node, the packet has gone around the ring at least once and the request has been completed. The result is then returned to the local output buffer 322. If the packet has not gone all the way around the ring at least once, it must go through the remainder of the node 300 including CAM controller 308, CAM array 340 and CAM output multiplexer 320 and eventually on to the next node on the ring system.

Still referring to FIG. 4, the process begins at segment S400. At segment S405, a determination is made as to whether a new packet has been received from the ring bus. If not, the process returns to segment S405 until a new packet is received. If yes, then at segment S410, a determination is made as to whether the source node of the packet is equal to this node. If not, then the packet is copied to the ring FIFO 304 for processing. If yes, then at segment S420, a determination is made as to whether the CAM is being operated in Cache mode and whether the command is a Search. If yes, then the packet is copied to the ring FIFO 304 for further processing at segment S415. If not, then the packet is copied to the local output buffer 322 at segment S425.

Figure 5:
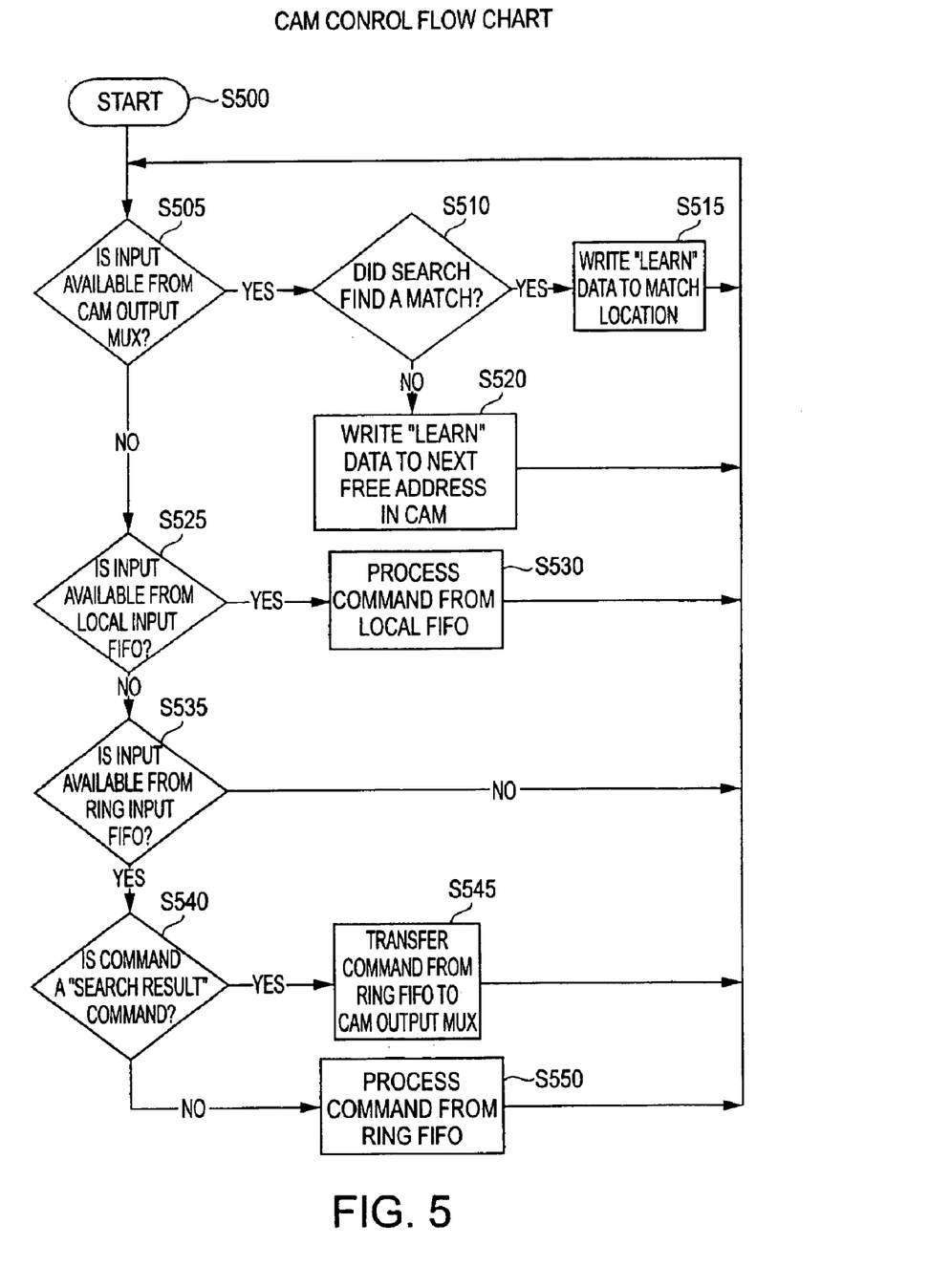
FIG. 5 depicts a flowchart illustrating an operational flow of the CAM controller of FIG. 3, in accordance with an exemplary embodiment of the invention.

Turning now to FIG. 5, a flowchart illustrates an operational flow of the CAM controller 308 (of FIG. 3), in accordance with an exemplary embodiment of the invention. In general, the CAM controller 308 handles scheduling of operations for the CAM array 310. Inputs received at the CAM controller 308 come from 3 different sources: commands from the ring bus 330, commands from the local input 334, and multi-cycle results from the CAM output multiplexer 320. In this exemplary embodiment, the Learn command is the only multi-cycle instruction.

The Learn command requires two operational cycles—first, a search operation to determine whether the data already exists in that particular CAM, and second, a write operation either to the same location as the existing data (if found) or to an empty memory location in the CAM (if not found).

A Search Result input from the ring FIFO 304 indicates that another CAM on the ring has already found a result for the search, and therefore, another search is not necessary in this local node. In such a case, the Search Result command is forwarded to the CAM output multiplexer 320.

Still referring to FIG. 5, the operation begins at segment S500. At segment S505, a determination is made as to whether there is an input available, via feedback path 326, from the CAM output multiplexer 320. If yes, then a determination is made, at segment S510, as to whether a match was found is response to the Search command. At segment S515, the Learn data (i.e., any data that originated as part of a Learn command) is re-written to the match location. If not, at segment S515, the Learn data is written to the next free memory address in the CAM array 310.

If there is no input available from the CAM output multiplexer 320 at segment, S505, then a determination is made as to whether there is an input available from the local FIFO 306 at segment S525. If yes, then the command received from the local FIFO (e.g., Search, Learn, Delete, etc.) is processed at segment S530. If not, then a determination is made, at segment S535, as to whether there is an input available from the ring FIFO 304.

If there is not an input available at the ring FIFO 304, then the process returns to segment S505. However, if there is an input available at the ring FIFO 304, then a determination is made as to whether the command is a Search Result command, at segment S540. If the command is a Search Result (i.e., the command which replaces an original Search command), then the command is transferred from ring FIFO 304 to the CAM output multiplexer 320, at segment S545. From there, the command can be forwarded to the local output 336 or to the ring bus output 332, or both. If the command is not a Search Result, then the command is processed at segment S550.

Figure 6:
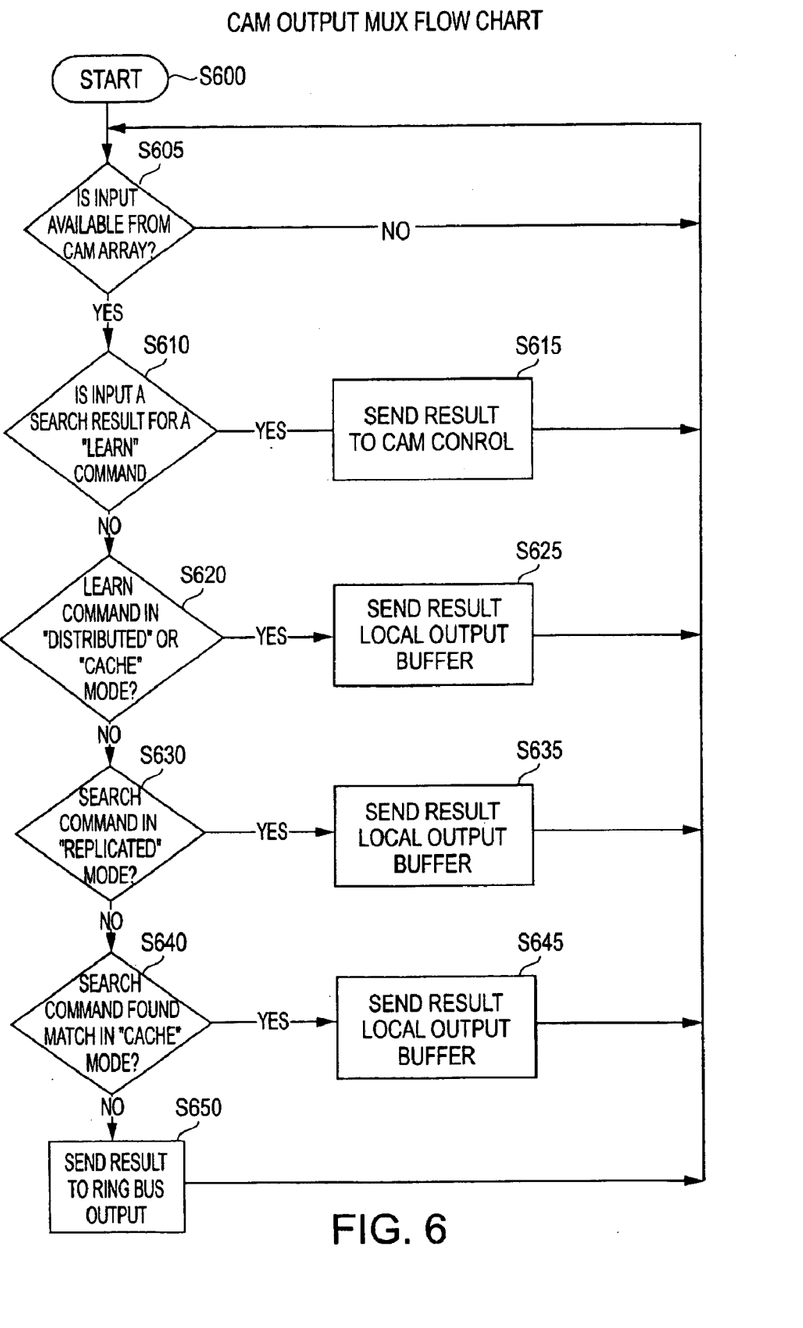
FIG. 6 depicts a flowchart illustrating an operational flow of the CAM output multiplexer of FIG. 3, in accordance with an exemplary embodiment of the invention.

Turning to FIG. 6, a flowchart illustrating an operational flow of the CAM output multiplexer 320 (of FIG. 3) is depicted, in accordance with an exemplary embodiment of the invention. In general, the CAM output multiplexer 320 receives the results from the CAM result registers 312–318 and decides whether to return them back to the CAM controller 308, to the local output buffers 322 or to the ring bus output 332.

The process begins at segment S600 and, at segment S605, a determination is made as to whether there is an input available from the CAM array 310 (i.e., actually the result registers 312–318 of the CAM array 310). If not, then the same determination is made until an input is available. If yes, then a determination is made, at segment S610, as to whether the input is a search result (i.e., the first operational cycle as described above) for a Learn command. If yes, then the result is sent to the CAM controller 308 via feedback path 326 at segment S615. If not, then a determination is made, at segment S620, as to whether the input is a Learn command in either the Distributed or the Cache mode of operation. If yes, then the results are sent to the local output buffer 322 at segment S625. If not, then a determination is made, at segment S630, as to whether the input is the result of a Search command in the Replicated mode.

If the determination at segment S630 is that the input is the result of a Search command in the Replicated mode, then the result is sent to the local output buffer 322 at segment S635. If the determination at segment S630 is that the input is not the result of a Search command in the Replicated mode, then a determination is made, at segment S640, as to whether the input is a result of a match found in response to a Search command in the Cache mode. If yes, then the result is sent to the local output buffer 322 at segment S645. If not, then the result is sent to the ring bus output 332 at segment S650.

Figure 7:
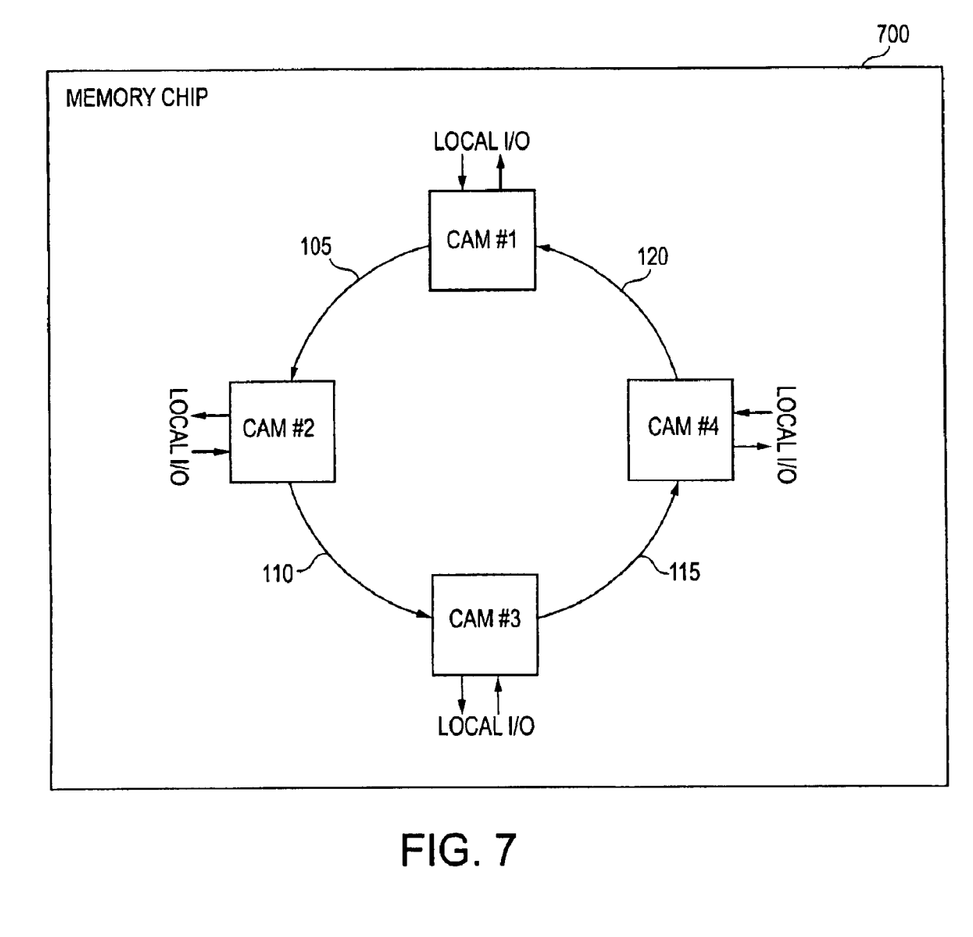
FIG. 7 depicts a memory chip containing a distributed CAM system, in accordance with an exemplary embodiment of the invention.

FIG. 7 depicts a distributed CAM ring system, such as the one depicted in FIG. 1, included on a semiconductor memory chip 700.

Figure 8:
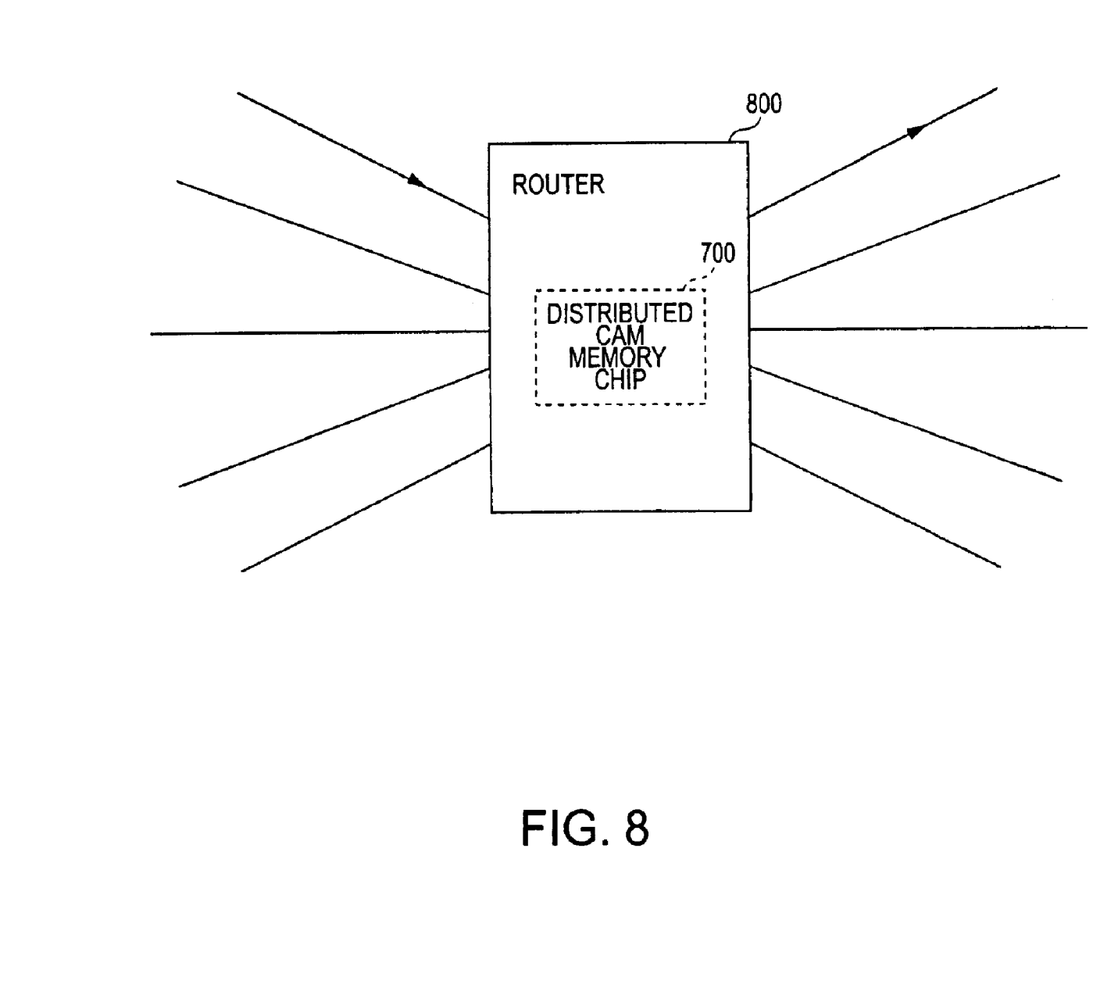
FIG. 8 depicts a simplified block diagram of a router employing the FIG. 8 memory chip containing a distributed CAM.

FIG. 8 is a simplified block diagram of a router 800 as may be used in a communications network, such as, e.g., part of the Internet backbone. The router 800 contains a plurality of input lines and a plurality of output lines. When data is transmitted from one location to another, it is sent in a form known as a packet (i.e., different from the packet structure described above in connection with FIG. 2). Oftentimes, prior to the packet reaching its final destination, that packet is first received by a router, or some other device. The router 800 then decodes that part of the data identifying the ultimate destination and decides which output line and what forwarding instructions are required for the packet.

Generally, CAMs are very useful in router applications because historical routing information for packets received from a particular source and going to a particular destination is stored in the CAM of the router. As a result, when a packet is received by the router 800, the router already has the forwarding information stored within its CAM. Therefore, only that portion of the packet that identifies the sender and recipient need be decoded in order to perform a search of the CAM to identify which output line and instructions are required to pass the packet onto a next node of its journey.

Still referring to FIG. 8, router 800 contains the added benefit of employing a semiconductor memory chip 700 containing a distributed CAM ring system, such as that depicted in FIG. 7. Therefore, not only does the router benefit from having a CAM but also benefits by having a CAM with potential for higher memory capacity and faster operation, in accordance with an exemplary embodiment of the invention.

It is desirable to have a large capacity CAM that operates faster than known CAMs. The present invention accomplishes this by providing a distributed CAM ring system 100 that performs traditional CAM operations on a plurality of smaller CAMs interconnected by high speed data buses. As illustrated by several exemplary embodiments of the invention, each of the smaller CAMs is located at a local node on the data bus and configured to receive commands originating from both the local node in which the CAM is located and a local node in which another CAM on the data bus is located. As the resources and the data being stored by all the CAMs are shared through the high speed data bus, the aggregate contents of all the CAMs can be viewed as being stored in a single virtual CAM.

While the invention has been described in detail in connection with preferred embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. For example, although the invention has been described in connection with high speed data buses 105–120 transmitting data in a counter-clockwise direction only, the data buses may just as easily transmit data in the clockwise direction. Further, there may be multiple high speed data buses coupling the plurality of CAMs together.

In addition, although the packet structure 200 is described in connection with certain specific portions and with certain specific commands, it should be readily apparent that the specific portions and commands are not critical for practicing the invention. Further, although the local node 300 is described as having certain components interconnected in a particular manner, it should be readily apparent that the specific components used are not critical.

Moreover, while the operation of certain components of the local node 800 are described in connection with flowcharts, it should be readily understood that the specific order of the operations is not necessarily critical to practicing the invention. In addition, while the invention is described in connection with four CAMs interconnected by high speed data lines, it should be readily apparent that any number of CAMs may be used to implement the invention.

What is claimed as new and desired to be protected by Letters Patent of the U.S. is:

1. A distributed content addressable memory (CAM), comprising:
 a plurality of CAMs interconnected on a ring bus by a first plurality of data paths that make up the ring bus such that a command received at a first CAM on said ring bus is executable by said first CAM and also by another CAM on the ring bus.

2. The distributed CAM of claim 1, wherein each of said plurality of CAMs is associated with a local node of said distributed CAM.

3. The distributed CAM of claim 1, wherein each CAM further comprises:
 a ring bus input for receiving first input data from said ring bus;
 a CAM controller coupled to said ring bus input for controlling processing of said first input data;
 a CAM array coupled to said CAM controller for comparing data stored by said CAM array with at least a portion of said first input data;
 a CAM output multiplexer coupled to said CAM array for receiving a result of the comparison and for generating first output data; and
 a ring bus output coupled to said CAM array for passing said first output data.

4. The distributed CAM of claim 3 further comprising:
 a local input for receiving second input data from a local node of said ring bus, an output of said local input being coupled to an input of said CAM controller; and
 a local output for passing second output data, generated by said CAM output multiplexer, to said local node of said ring bus.

5. The distributed CAM of claim 4 further comprising
 a local first-in-first-out (FIFO) buffer coupled between the local input and the CAM controller for temporarily storing said second input data; and
 a local output buffer coupled between said CAM output multiplexer and said local output for temporarily storing said second output data.

6. The distributed CAM of claim 3 further comprising:
 a plurality of result registers respectively coupled between said CAM array and said CAM output multiplexer for storing the results of the comparisons between the stored data and said at least a portion of the first input data.

7. The distributed CAM of claim 1 further comprising:
 an input controller coupled between the ring bus input and the CAM controller for controlling routing of said first input data.

8. The distributed CAM of claim 7 further comprising:
 a ring first-in-first-out (FIFO) buffer coupled between said input controller and said CAM controller for temporarily storing said first input data.

9. The distributed CAM of claim 7 further comprising:
 a data path coupling said input controller and a local output of said CAM such that a result received by said CAM from another CAM on said ring bus is directed to said local output.

10. The distributed CAM of claim 1, wherein said plurality of CAMs are interconnected by a second ring bus.

11. A distributed content addressable memory (CAM), comprising:
 a plurality of CAMs interconnected on a ring bus by a plurality of data paths that make up the ring bus such that a command received at a first CAM on said ring bus is executable at said first CAM and also executable at every other CAM on said ring bus.

12. A distributed content addressable memory (CAM), comprising:
 a first CAM having a data input and a data output; and
 a data input of a second CAM coupled to said data output of said first CAM via a first data path, and a data output of said second CAM coupled to said data input of said first CAM via a second data path such that a command received from a local input of said first CAM is executable at both said first and said second CAMs.

13. A semiconductor memory chip, comprising:
 a distributed content addressable memory (CAM), said distributed CAM comprising:
 a plurality of CAMs interconnected on a ring bus by a plurality of data paths that make up the ring bus such that a command received at a first CAM on said ring bus is executable at said first CAM and also executable at at least a second CAM of said plurality of CAMs.

14. The memory chip of claim 13, wherein each of said plurality of CAMs is associated with a local node of said distributed CAM.

15. The memory chip of claim 13, wherein each CAM further comprises:
 a ring bus input for receiving first input data from said ring bus;
 a CAM controller coupled to said ring bus input for controlling processing of said first input data;
 a CAM array coupled to said CAM controller for comparing data stored by said CAM array with at least a portion of said first input data;
 a CAM output multiplexer coupled to said CAM array for receiving a result of the comparison and for generating first output data; and
 a ring bus output coupled to said CAM array for passing said first output data.

16. The memory chip of claim 15, wherein each CAM further comprises:
 an input controller coupled between the ring bus input and the CAM controller for controlling routing of said first input data.

17. The memory chip of claim 16, wherein each CAM further comprises:
 a ring first-in-first-out (FIFO) buffer coupled between said input controller and said CAM controller for temporarily storing said first input data.

18. The memory chip of claim 16, wherein each CAM further comprises:
 a data path coupling said input controller and a local output of said CAM such that a result received by said CAM from another CAM on said ring bus is directed to said local output.

19. The memory chip of claim 15, wherein each CAM further comprises:
 a plurality of result registers respectively coupled between said CAM array and said CAM output multiplexer for storing the result of the comparison between the stored data and said at least a portion of the first input data.

20. The memory chip of claim 15, wherein each CAM further comprises:
 a local input for receiving second input data from a local node of said ring bus, an output of said local input being coupled to an input of said CAM controller; and a local output for passing second output data, generated by said CAM output multiplexer, to said local node of said ring bus.

21. The memory chip of claim 20, wherein each CAM further comprises:
a local first-in-first-out (FIFO) buffer coupled between the local input and the CAM controller for temporarily storing said second input data; and
a local output buffer coupled between said CAM output multiplexer and said local output for temporarily storing said second output data.

22. The memory chip of claim 13, wherein said plurality of CAMs are interconnected by a second ring bus.

23. A router, comprising:
a plurality of message receiving inputs;
a plurality of message transmitting outputs; and
a distributed content addressable memory (CAM) for providing routing information for information flow from said inputs to said outputs, said distributed CAM comprising:
a plurality of CAMs interconnected on a ring bus by a plurality of data paths that make up the ring bus such that a command received at a first CAM on said ring bus is executable by said first CAM and also by another CAM on the ring bus.

24. The router of claim 23, wherein each of said plurality of CAMs is associated with a local node of said distributed CAM.

25. The router of claim 23, wherein each CAM further comprises:
a ring bus input for receiving first input data from said ring bus;
a CAM controller coupled to said ring bus input for controlling processing of said first input data;
a CAM array coupled to said CAM controller for comparing data stored by said CAM array with at least a portion of said first input data;
a CAM output multiplexer coupled to said CAM array for receiving a result of the comparison and for generating first output data; and
a ring bus output coupled to said CAM array for passing said first output data.

26. The router of claim 25, wherein each CAM further comprises:
an input controller coupled between the ring bus input and the CAM controller for controlling routing of said first input data.

27. The router of claim 26, wherein each CAM further comprises:
a ring first-in-first-out (FIFO) buffer coupled between said input controller and said CAM controller for temporarily storing said first input data.

28. The router of claim 26, wherein each CAM further comprises:
a data path coupling said input controller and a local output of said CAM such that a result received by said CAM from another CAM on said ring bus is directed to said local output.

29. The router claim 25, wherein each CAM further comprises:
a local input for receiving second input data from a local node of said ring bus, an output of said local input being coupled to an input of said CAM controller; and
a local output for passing second output data, generated by said CAM output multiplexer, to said local node of said ring bus.

30. The router of claim 29, wherein each CAM further comprises:
a local first-in-first-out (FIFO) buffer coupled between the local input and the CAM controller for temporarily storing said second input data; and
a local output buffer coupled between said CAM output multiplexer and said local output for temporarily storing said second output data.

31. The router of claim 25, wherein each CAM further comprises:
a plurality of result registers respectively coupled between said CAM array and said CAM output multiplexer for storing the results of the comparisons between the stored data and said at least a portion of the first input data.

32. The router of claim 23 further comprising a semiconductor chip containing said distributed CAM.

33. The router of claim 23, wherein said plurality of CAMs are interconnected by a second ring bus.

34. A method for operating a distributed content addressable memory (CAM), the method comprising:
receiving a command at a first CAM of a plurality of CAMs interconnected on a ring bus; and
initiating execution of said command at said first CAM; and
if execution of said command at said first command at said first CAM does not occur, initiating execution of said command at at least a second CAM of said plurality of CAMs.

35. A method for operating a distributed content addressable memory (CAM), the method comprising:
receiving a command at a first CAM of a plurality of CAMs interconnected on a ring bus;
executing said command at a second CAM on said ring bus; and
passing a result of said executing operation to said first CAM via said ring bus.

36. The method of claim 35 further comprising:
receiving said result at a ring bus input of said first CAM;
passing said result to a local output buffer of said first CAM; and
receiving said result at a local node coupled to said local output buffer.

37. The method of claims 35, wherein said act of receiving comprises:
receiving said command at a local input of said first CAM.

38. The method of claim 37, wherein said act of receiving comprises:
receiving said command at a CAM controller of said first CAM;
unsuccessfully attempting to execute said command at a CAM array of said first CAM; and
generating a first data output to be sent to said second CAM in an attempt to execute said command in said second CAM.

39. The method of claim 35, wherein said act of executing comprises:
passing said command from said first CAM to said ring bus via a ring bus output of said first CAM;
receiving said command at a ring bus input of said second CAM; and
executing said command at said second CAM.

40. The method of claim 39, wherein said act of receiving comprises:

receiving said command at a CAM controller of said second CAM;

executing said command at a CAM array of said second CAM; and generating a data output to be sent from said second CAM to said first CAM notifying said first CAM that said command has been executed.

41. The method of claim 35, wherein said act of passing comprises:

passing said result of said executing operation to a ring bus output of said second CAM and to said ring bus; and receiving said result at a ring bus input of said first CAM.

* * * * *